(12) United States Patent
Dattathreya

(10) Patent No.: US 8,224,797 B2
(45) Date of Patent: Jul. 17, 2012

(54) SYSTEM AND METHOD FOR VALIDATING DATA RECORD

(75) Inventor: Macam S. Dattathreya, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 12/041,761

(22) Filed: Mar. 4, 2008

(65) Prior Publication Data

US 2009/0228435 A1  Sep. 10, 2009

(51) Int. Cl.
  *G06F 7/00* (2006.01)
  *G06F 17/00* (2006.01)
(52) U.S. Cl. .................................................. 707/702
(58) Field of Classification Search .................. 707/687, 707/690, 692, 702
  See application file for complete search history.

(56) References Cited

U.S. PATENT DOCUMENTS

| | | | |
|---|---|---|---|
| 6,014,674 A | | 1/2000 | McCargar |
| 6,374,252 B1 * | | 4/2002 | Althoff et al. ................. 707/102 |
| 6,466,943 B1 * | | 10/2002 | Craig ............................. 707/102 |
| 6,629,098 B2 * | | 9/2003 | Mc George, Jr. ................. 707/6 |
| 6,687,559 B2 | | 2/2004 | Radjy et al. |
| 6,795,821 B2 * | | 9/2004 | Yu ..................................... 707/3 |
| 6,968,349 B2 * | | 11/2005 | Owen et al. .................... 707/204 |
| 6,970,880 B2 * | | 11/2005 | Camarillo ..................... 707/102 |
| 7,099,836 B2 | | 8/2006 | Cichanowicz |
| 7,127,475 B2 | | 10/2006 | Gotz et al. |
| 7,185,317 B2 * | | 2/2007 | Fish et al. ...................... 717/121 |
| 7,213,227 B2 | | 5/2007 | Kompalli et al. |
| 7,225,197 B2 | | 5/2007 | Lissar et al. |
| 7,225,425 B2 | | 5/2007 | Kompalli et al. |
| 7,237,225 B2 | | 6/2007 | Kompalli et al. |
| 7,257,818 B2 | | 8/2007 | Foerg et al. |
| 7,257,820 B2 | | 8/2007 | Fischer et al. |
| 7,725,483 B2 * | | 5/2010 | Poyourow et al. ............. 707/763 |
| 7,734,625 B2 * | | 6/2010 | Weinberg et al. .............. 707/736 |
| 7,752,196 B2 * | | 7/2010 | Rogers ........................... 707/716 |
| 2005/0114369 A1 * | | 5/2005 | Gould et al. .................... 707/100 |
| 2007/0203933 A1 * | | 8/2007 | Iversen et al. .................. 707/102 |

* cited by examiner

*Primary Examiner* — Marc Somers
(74) *Attorney, Agent, or Firm* — Schmeiser, Olsen & Watts; John R. Pivnichny

(57) ABSTRACT

A system and associated method for utilizing a record stored in a database. An application requests the record stored in the database to be validated. The method executes a query for retrieval and validation in a unified operation. A set of valid values for an attribute is stored in a configuration table per attribute. The query sets a null value for an attribute in the record that has an invalid value and produces a validated record. The method creates a data object with the validated record. The requester application utilized the data object having a respective value and a corresponding validity flag for each attribute.

24 Claims, 12 Drawing Sheets

REQUISITION ITEM (REQITEM) TABLE 610

| REQID | REQITNUM | CURR_CD | UOM_CD | CTRY_CD |
|---|---|---|---|---|
| ABCD | 1 | USD | HR | US |
| ABCD | 2 | RUP | KEG | IN |
| ABCD | 3 | SUR | PTR | ZM |

CURRENCY TABLE 620

| CURR_CD | Currency Description |
|---|---|
| USD | US Dollars |
| RUP | Rupees |
| DNR | Dinar |

UNIT OF MEASURE (UOM) TABLE 630

| UOM_CD | UOM Description |
|---|---|
| HR | Hour |
| KGR | Keg |
| PTR | Pointer |

COUNTRY TABLE 640

| CTRY_CD | Country Description |
|---|---|
| US | USA |
| IN | India |
| GB | Great Britain |

FIG. 3A

BUSINESS OBJECT TABLE 650

| REQID | REQITNUM | CURR_CD | CURR_CD_VLDT | UOM_CD | UOM_CD_VLDT | CTRY_CD | CTRY_CD_VLDT |
|---|---|---|---|---|---|---|---|
| ABCD | 1 | USD | USD | HR | HR | US | US |
| ABCD | 2 | RUP | RUP | KEG |  | IN | IN |
| ABCD | 3 | SUR |  | PTR | PTR | ZM |  |

FIG. 3B

EXAMPLE QUERY OF QUERY PROCESS IN STRUCTURED QUERY LANGUAGE (SQL)
660

```
L01:   SELECT
L02:   A.REQID,
L03:   A.REQITNUM,
L04:   A.CURR_CD,
L05:   CASE WHEN B.CURR_CD IS NOT NULL
L06:        THEN B.CURR_CD
L07:        ELSE ''
L08:        END
L09:        CURR_CD_VLDT,
L10:   A.UOM_CD,
L11:   CASE WHEN C.UOM_CD IS NOT NULL
L12:        THEN C.UOM_CD
L13:        ELSE ''
L14:        END
L15:        UOM_CD_VLDT,
L16:   A.CTRY_CD,
L17:   CASE WHEN D.CTRY_CD IS NOT NULL
L18:        THEN D.CTRY_CD
L19:        ELSE ''
L20:        END
L21:        CTRY_CD_VLDT,
L22:   FROM    REQITEM A
L23:     LEFT OUTER JOIN CURRENCY B
L24:                 ON A.CURR_CD = B.CURR_CD
L25:     LEFT OUTER JOIN UOM C
L26:                 ON A.UOM_CD = C.UOM_CD
L27:     LEFT OUTER JOIN COUNTRY D
L28:                 ON A.CTRY_CD = D.CTRY_CD
L29:   WHERE   A.REQID = 'ABCD'
```

FIG. 4

EXAMPLE JAVA® CODE OF DATA VALIDATOR
500

```
L501:    class RequisitionItem{
L502:    String currency;
L503:    String unitofMeasure;
L504:    String country;
L505:    boolean currencyValid=false;
L506:    boolean uomValid =false;
L507:    boolean countryValid =false;

//Set the currency value and set if the currency is
         //valid or not based on the blank value
         //SetValidatedUom() and SetValidatedCountry() are
         //similarly defined.
L508: public String setValidatedCurrency(String currencyCode,
L509: String validatedCurrency){
L510:    currency = currencyCode;
L511:    if(validatedCurrency!=null &&
L512:       (!validatedCurrency.equals("")){
L513:          currencyValid = true;
L514:    }
L515: }

//Returns the actual value of currency code of
         //the requisition item
         //getUom() and getCountry() are similarly defined.
L516: public String getCurrency(){
L517: return currency;
L518: }

//Returns if the currency code in the requisition item
         //is valid or not
         //isUomValid() and isCountryValid() are similarly
         //defined
L519: public boolean isCurrencyValid(){
L520: return currencyValid;
L521: }
```

FIG. 5A

EXAMPLE JAVA® CODE OF DATA VALIDATOR (CONT'D)
500

```
       //class RequisitionItem cont'd

//Method to return if this requisition item has any
       //invalid elements
L522:  public boolean hasAnyInvalidDataelement(){
L523:  return isCurrencyValid() && isUomValid()&&
L524:  isCountryValid();
L525:  }

//Method to return if this requisition item has valid
       //elements
L526:  public boolean hasAnyValidDataelement(){
L527:  if( isCurrencyValid() || isUomValid() ||
L528:  isCountryValid()){
L529:     return true;
L530:  }
L531:  return false;
L532:  }
L533:  }
```

FIG. 5B

EXAMPLE JAVA® CODE OF DATA VALIDATOR (CONT'D)
500

```
      /*
       * RequisitionItemList - super data structure holding
       * all RequisitionItem object
       * Determines if this list has any requisitionItem with
       * invalid data element
       * @return boolean
       */
L534: public boolean hasItemWithInvalidDataElement() {
L535: Iterator iter = this.iterator();
L536: boolean itemwithInvalidData =false;
L537: while(iter.hasNext()){
L538:    RequisitionItem item = (RequisitionItem)iter.next();
L539:    if(item.hasAnyInvalidDataelement()){
L540:       itemwithInvalidData= true;
L541:       break;
L542:    }
L543: }
L544: return itemwithInvalidData;
L545: }

/*
       * Determines if this list has any requisitionItem with
       * valid data element
       * @return boolean
       */
L546: public boolean hasItemWithValidDataElement() {
L547: Iterator iter = this.iterator();
L548: boolean itemwithvalidData =false;
L549: while(iter.hasNext()){
L550:    RequisitionItem item = (RequisitionItem)iter.next();
L551:    if(item.hasAnyValidDataelement()){
L552:       itemwithvalidData = true;
L553:       break;
L554:    }
L555: }
L556: return itemwithvalidData;
L557: }
```

FIG. 5C

EXAMPLE JAVA® CODE OF DATA VALIDATOR (CONT'D)
500

```
      /*
       * RequisitionItemList - super data structure hodling
       * all RequisitionItem object
       * Determines if this list has any requisitionItem with
       * invalid currency code
       * @return boolean
       * hasItemWithInvalidUomCode() and
       * hasItemWithInvalidCountryCode() are similarly defined
       */
L558: public boolean hasItemWithInvalidCurrencyCode() {
L559: Iterator iter = this.iterator();
L560: boolean itemwithInvalidData =false;
L561: while(iter.hasNext()){
L562:    RequisitionItem item = (RequisitionItem)iter.next();
L563:    if(!item.isCurrencyValid()){
L564:       itemwithInvalidData = true;
L565:       break;
L566:    }
L567: }
L568: return itemwithvalidData;
L569: }
```

FIG. 5D

SYSTEM AND METHOD FOR VALIDATING DATA RECORD

FIELD OF THE INVENTION

The present invention discloses a system and associated method for utilizing data stored in a database and/or databases for a business application.

BACKGROUND OF THE INVENTION

Conventional business application databases are updated due to transactions over time, but validating data stored in conventional business application databases requires multiple retrieval and complex administration of each database. Thus, there is a need for a system and associated method that overcomes at least one of the preceding disadvantages of current methods and systems for data validation.

SUMMARY OF THE INVENTION

The present invention provides a method for utilizing a record stored in a database, the method comprising:

receiving a request from a requester application for validating the record, the record comprising at least one attribute having a respective value provided in the record;

subsequent to said receiving, validating the record resulting in a validated record, wherein the database comprises at least one configuration table corresponding to said at least one attribute, wherein each configuration table contains a set of valid values for each attribute, wherein the record is validated if each attribute in the record is either valid or invalid, wherein a first attribute is valid if the first attribute has a first respective value that is contained in a first configuration table for the first attribute, wherein the first attribute is invalid if the first attribute has the first respective value that is null;

subsequent to said validating, creating a record object with the record from said validating, wherein the record object comprises said at least one attribute and a validity flag per attribute; and subsequent to said creating, sending the record object to the requester application, wherein said receiving, said validating, said creating, and said sending are performed by a data validator.

The present invention provides a computer program product, comprising a computer usable medium having a computer readable program code embodied therein, said computer readable program code containing instructions that when executed by a processor of a computer system implement a method for utilizing a record stored in a database, the method comprising:

receiving a request from a requester application for validating the record, the record comprising at least one attribute having a respective value provided in the record;

subsequent to said receiving, validating the record resulting in a validated record, wherein the database comprises at least one configuration table corresponding to said at least one attribute, wherein each configuration table contains a set of valid values for each attribute, wherein the record is validated if each attribute in the record is either valid or invalid, wherein a first attribute is valid if the first attribute has a first respective value that is contained in a first configuration table for the first attribute, wherein the first attribute is invalid if the first attribute has the first respective value that is null;

subsequent to said validating, creating a record object with the record from said validating, wherein the record object comprises said at least one attribute and a validity flag per attribute; and subsequent to said creating, sending the record object to the requester application, wherein said receiving, said validating, said creating, and said sending are performed by a data validator.

The present invention provides a computer system comprising a processor and a computer readable memory unit coupled to the processor, said memory unit containing instructions that when executed by the processor implement a method for utilizing a record stored in a database, the method comprising:

receiving a request from a requester application for validating the record, the record comprising at least one attribute having a respective value provided in the record;

subsequent to said receiving, validating the record resulting in a validated record, wherein the database comprises at least one configuration table corresponding to said at least one attribute, wherein each configuration table contains a set of valid values for each attribute, wherein the record is validated if each attribute in the record is either valid or invalid, wherein a first attribute is valid if the first attribute has a first respective value that is contained in a first configuration table for the first attribute, wherein the first attribute is invalid if the first attribute has the first respective value that is null;

subsequent to said validating, creating a record object with the record from said validating, wherein the record object comprises said at least one attribute and a validity flag per attribute; and subsequent to said creating, sending the record object to the requester application, wherein said receiving, said validating, said creating, and said sending are performed by a data validator.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for utilizing a record stored in a database, the method comprising:

receiving a request from a requester application for validating the record, the record comprising at least one attribute having a respective value provided in the record;

subsequent to said receiving, validating the record resulting in a validated record, wherein the database comprises at least one configuration table corresponding to said at least one attribute, wherein each configuration table contains a set of valid values for each attribute, wherein the record is validated if each attribute in the record is either valid or invalid, wherein a first attribute is valid if the first attribute has a first respective value that is contained in a first configuration table for the first attribute, wherein the first attribute is invalid if the first attribute has the first respective value that is null;

subsequent to said validating, creating a record object with the record from said validating, wherein the record object comprises said at least one attribute and a validity flag per attribute; and subsequent to said creating, sending the record object to the requester application, wherein said receiving, said validating, said creating, and said sending are performed by a data validator.

The present invention provides a method and system that overcomes at least one of the current disadvantages of conventional method and system for validating data in application database.

BRIEF DESCRIPTION OF THE DRAWINGS

FIG. 3A illustrates data of the business application represented in tables in the business application database, in accordance with the embodiments of the present invention.

FIG. 3B illustrates a record object table in a database representing a record object that is returned to a requester application in step 1304 of FIG. 2, after performing the method of the present invention over tables illustrated in FIG. 3A, in accordance with the embodiments of the present invention.

FIG. 4 illustrates a query in Structured Query Language (SQL) to attain a record object table of FIG. 3B, in accordance with the embodiments of the present invention.

FIGS. 5A, 5B, 5C and 5D illustrate example Java® program codes of the data validator, in accordance with embodiments of the present invention.

DETAILED DESCRIPTION OF THE INVENTION

Figure 1:
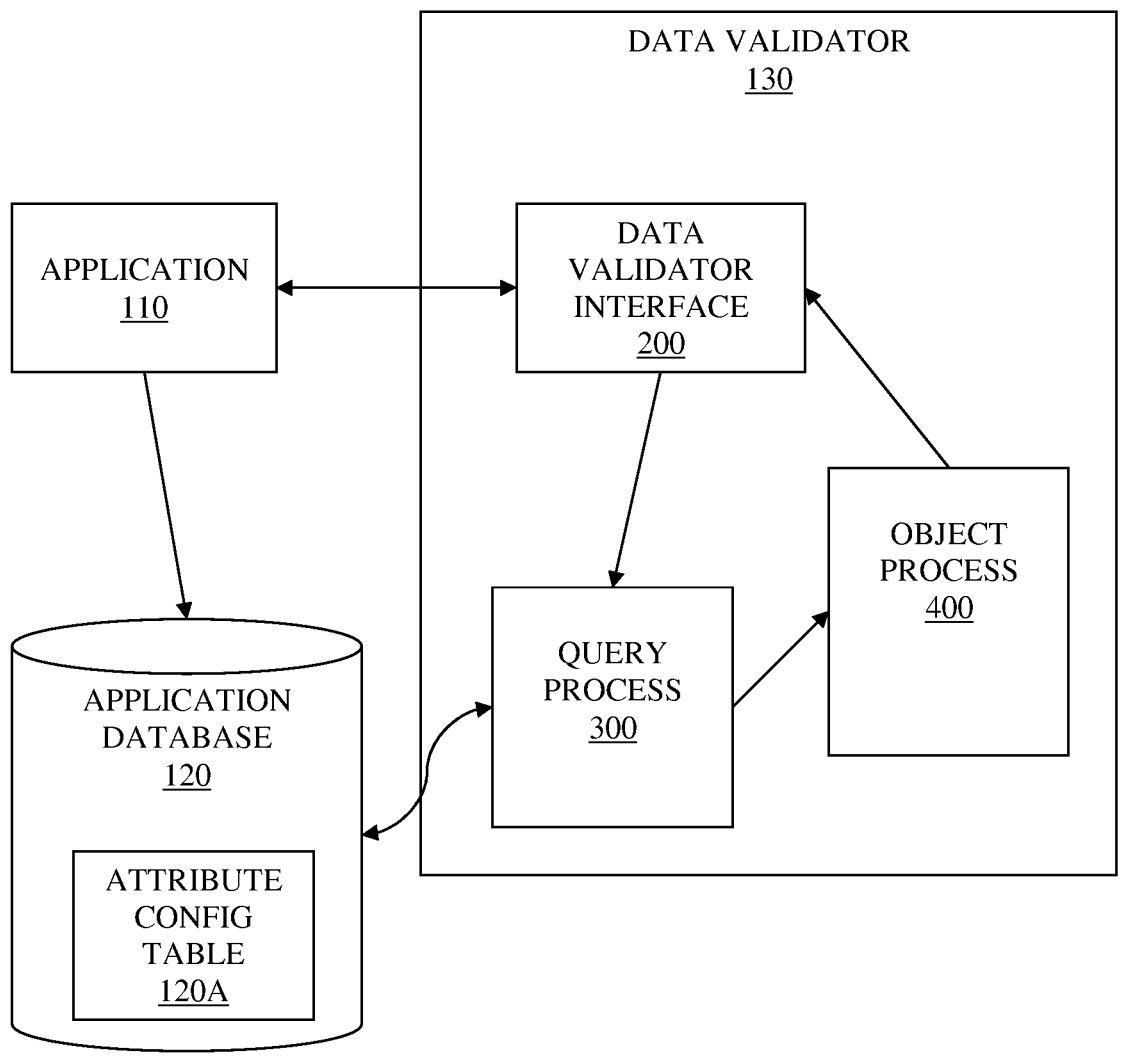
FIG. 1 illustrates a system for validating business data, in accordance with embodiments of the present invention.

FIG. 1 illustrates a system for validating business data, in accordance with embodiments of the present invention.

A business data validating system 100 comprises a business application 110, a business application database 120, and a data validator 130. The data validator 130 comprises a data validator interface 200, a query process 300, and an object process 400.

The business application 110 has multiple business objects that represent data entities and/or business transactions that are accommodated by the business application 110. Examples of the business application 110 include, inter alia, a procurement requisition system, etc. Examples of conventional procurement applications may include, inter alia, Ariba® and SAP SRM (Supplier Relationship Management). Examples of business objects include, inter alia, a requisition item, a requisition, a purchase order item, a purchase order, an invoice item, an invoice, etc.

The business application data base 120 comprises a record that represents data entity and/or a business transaction necessary to perform the business application 110. Each record has attributes to describe properties of the record. An attribute configuration table 120A comprises a set of valid data values for the attribute that is available for the business application 110. For example, if the attribute is a currency, a currency configuration table in the database has all valid currency values that a business transaction may use. See FIG. 3A for examples.

The business application 110 modifies records stored in the business application database 120 while performing transactions. Thus, a set of valid data values for an attribute changes over time. The attribute configuration table 120A is updated accordingly by a database administrator or by an automated update process. However, there may be a data value in the business application database 120 that has become invalid due to a recent transaction of the business application 110. To assure validity of the data value stored in the business application database 120, the attribute configuration table 120A must be consulted on all attributes of a business object. When the business application 110 attempts to use a business object, it is also necessary to validate data values of all attributes that describes the business object. Thus, the business application 110 sends a request for data validation to the data validator 130. The method of the present invention validates data values for all attributes of the business object against the attributes configuration tables 120A upon a request of the business application 110.

The data validator interface 200 is an interface between the business application 110 and the data validator 130. The data validator interface 200 processes and transfers a data validating request from the business application 110 to the query process 300 and receives a business object instantiated with validated data from the object process 400. The data validator interface 200 returns the business object to the business application 110.

The query process 300 interacts with the business application database 120. The query process 300 executes a query upon the business application database 120 to retrieve validated data that has been requested by the business application 110. Then the query process 300 passes a result of the query to the object process 400.

The object process 400 analyzes the validated data received from the query process 300 and instantiates a business object with the validated data. By examining a value associated with an attribute in the business object, the object process 400 marks an invalid attribute in the business object. The object process 400 passes the business object as the result of the data validating request to the data validator interface 200 which will forward the business object to the business application 110.

In one embodiment of the present invention, the data validator 130 is programmed in Java® language and a query of the query process 300 is written in Structured Query Language (SQL).

Figure 2:
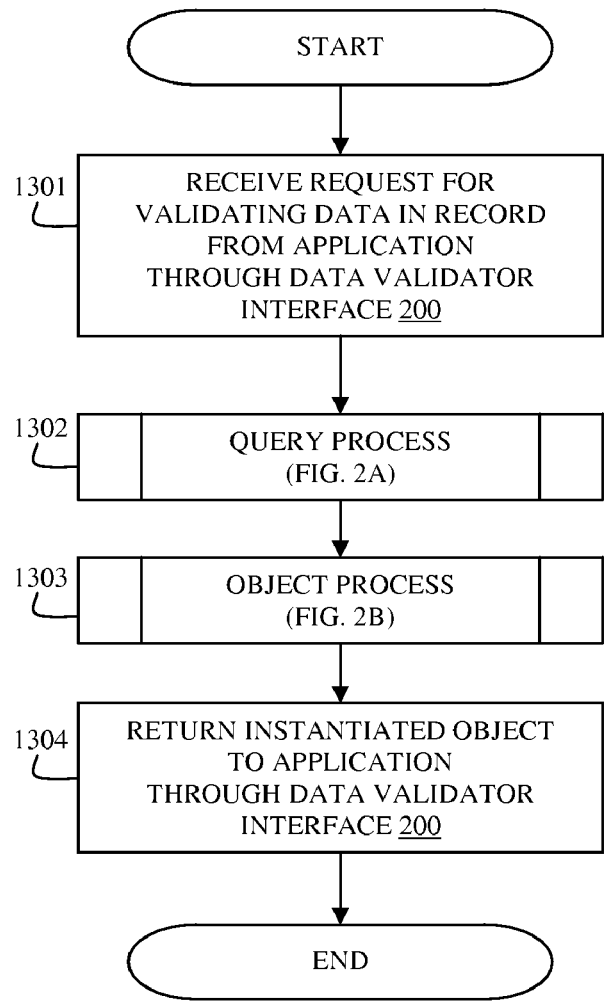
FIG. 2 is a flowchart depicting a method for the data validator of FIG. 1, in accordance with the embodiments of the present invention.

FIG. 2 is a flowchart depicting a method for the data validator of FIG. 1, supra, in accordance with the embodiments of the present invention.

In step 1301, the data validator interface of the data validator receives a request for data validation from a business application. The data validator interface processes and transfers the received request to the query process.

In step 1302, the query process of the data validator executes a query against a business application database to service the request. The query process of the data validator uses a query to validate all data attributes that are spread in multiple records. See FIG. 2A, infra, for details of the query process.

In step 1303, the object process of the data validator processes a result of the query executed in step 1302. The object process instantiates the business object and flags valid data based on the result of the query. The business object is programmable with modules that perform specific functions on the business object. See FIG. 2B, infra, for details of the object process.

In step 1304, the data validator interface of the data validator receives the business object instantiated in step 1303 and returns the business object to the business application that had sent the request for data validation.

Figure 2A:
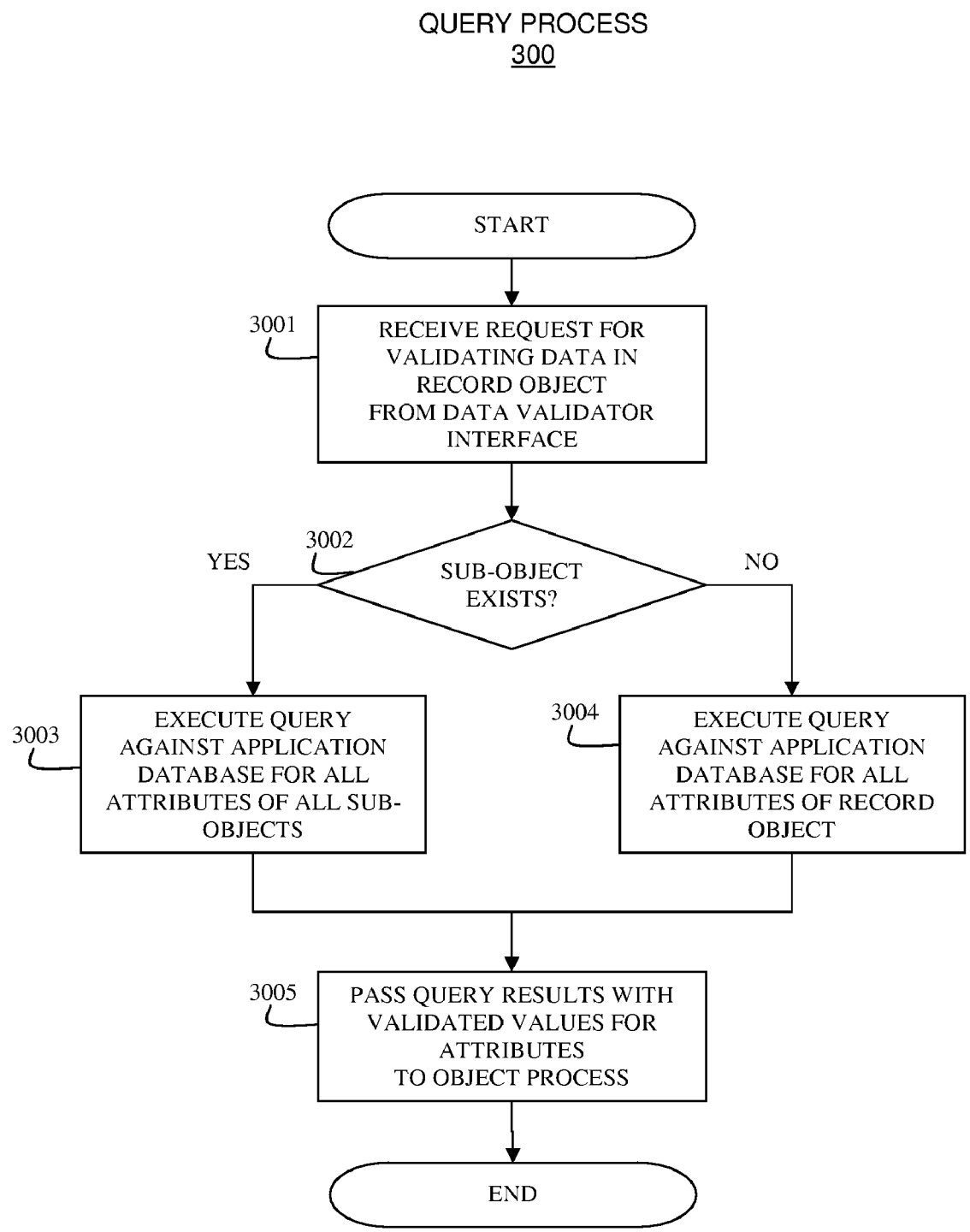
FIG. 2A is a flowchart depicting a method for the query process performing step 1302 of FIG. 2, in accordance with the embodiments of the present invention.

FIG. 2A is a flowchart depicting a method for the query process performing step 1302 of FIG. 2, supra, in accordance with the embodiments of the present invention.

In step 3001, the query process receives a request for data validation from the data validator interface.

In step 3002, the query process determines whether a business object comprises any sub-objects in the business object. A sub-object of a parent business object is also an object that is a component of the parent business object. The sub-object comprises an attribute. For example, a requisition object comprises multiple requisition item objects, and each requisition item object comprises a supplier attribute and an item code attribute. If the query process determines that a business object has any sub-objects in the business object, then the query process proceeds with step 3003. If the query process determines that a business object does not have any sub-objects in the business object, then the query process proceeds with step 3004.

In step 3003, the business object is a parent business object comprising sub-objects. The query process executes a query upon the business application database to retrieve validated data values for all attributes of all sub-objects of the parent business object. If an attribute of a sub-object has an invalid data value, the query process sets a data value for the attribute to a null value. If an attribute of a sub-object has a valid data value, the query process uses the valid data value.

In step 3004, the business object comprises only attributes without any sub-object. The query process executes a query upon the business application database to retrieve validated data for all the attributes of the business object. If an attribute of the business object has an invalid data value, the query process sets a data value for the attribute to a null value. If an attribute of the business object has a valid data value, the query process uses the valid data value.

In steps 3003 and 3004, the query is constructed to retrieve data values of multiple attributes from the business application database. The query adds a validity field for each attribute to be validated. A result of the query comprises a same number of records as a number of primary keys that identify records.

In step 3005, the query process produces a result of the query in step 3003 or step 3004. The query process provides the result of the query as an input to the object process.

Figure 2B:
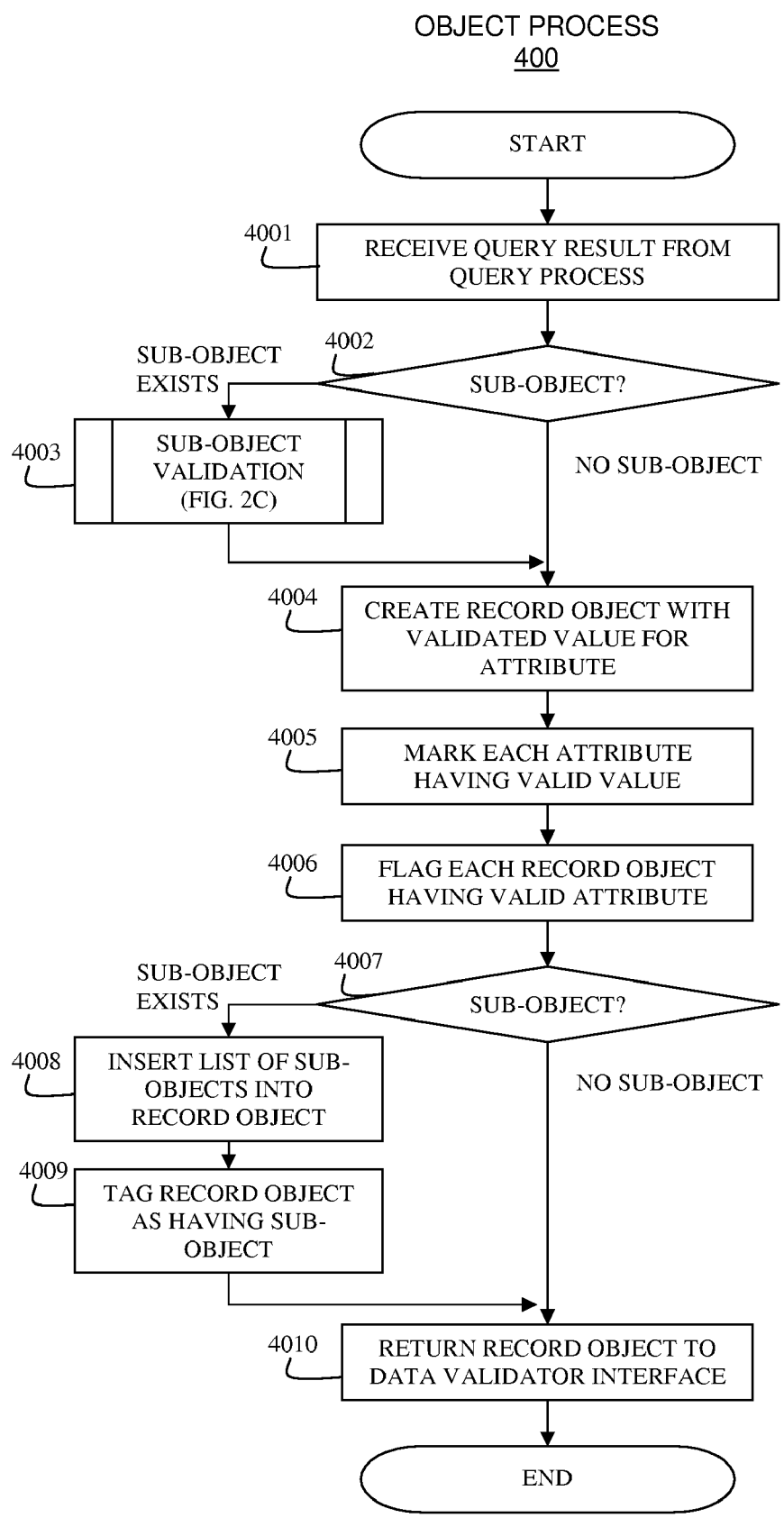
FIG. 2B is a flowchart depicting a method for the object process performing step 1303 of FIG. 2, in accordance with the embodiments of the present invention.

FIG. 2B is a flowchart depicting a method for the object process performing step 1303 of FIG. 2, supra, in accordance with the embodiments of the present invention.

In step 4001, the object process receives the result of the query from the query process.

In step 4002, the object process determines whether the business object has sub-objects within the business object. If the object process determines that the business object has sub-objects within the business object, then the object process proceeds with step 4003. If the object process determines that the business object does not have sub-objects within the business object, then the object process proceeds with step 4004.

In step 4003, the object process instantiates all sub-objects, marks validity of each sub-object, and subsequently groups sub-objects into a sub-object list. See FIG. 2C, infra, for details.

In step 4004, the object process instantiates business objects that comprise attributes and validity fields of each business object.

In step 4005, the object process flags all valid attributes that have a non-null value in a validity field of the attribute in the business object.

In step 4006, the object process flags each business object as valid if any attribute of the business object is valid.

In step 4007, the object process determines whether a business object has any sub-objects in the business object. If the object process determines that a business object has any sub-objects, then the object process proceeds with step 4008. If the object process determines that a business object does not have any sub-objects, then the object process proceeds with step 4010.

In step 4008, the object process inserts the sub-object list from step 4003 into the business object. In step 4009, the object process flags the business object indicating that the business object comprises sub-objects.

In step 4010, the object process returns the business object to the data validator interface, which returns the business object to the business application.

Figure 2C:
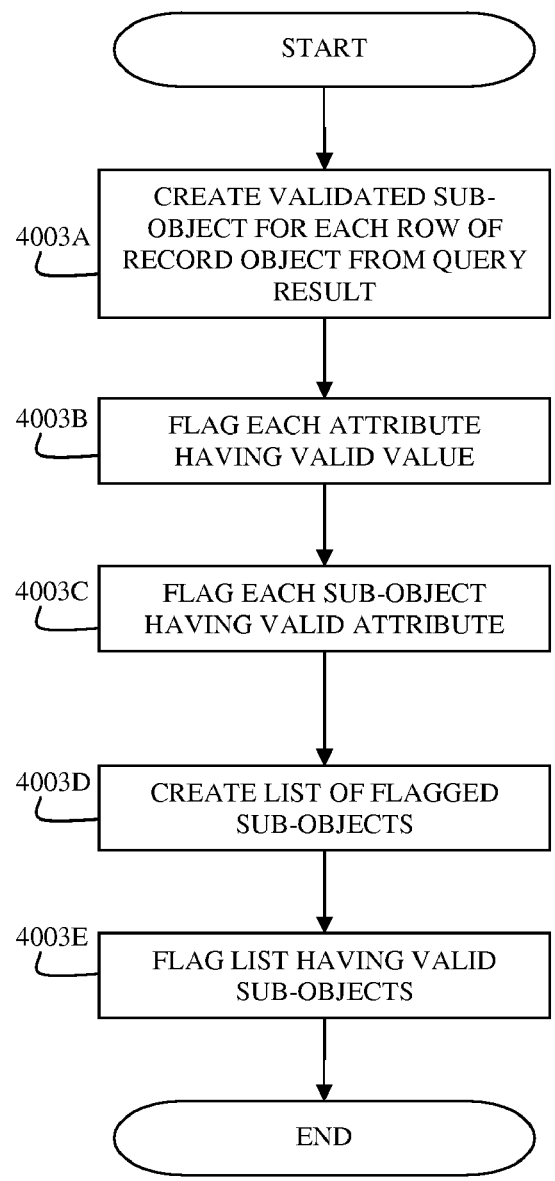
FIG. 2C is a flowchart depicting a method for the object process performing step 4003 of FIG. 2B, in accordance with the embodiments of the present invention.

FIG. 2C is a flowchart depicting a method for the object process performing step 4003 of FIG. 2B, supra, in accordance with the embodiments of the present invention.

In step 4003A, the object process instantiates sub-objects that comprise attributes and validity fields of each sub-object.

In step 4003B, the object process flags all valid attributes that have a non-null value in a validity field of the attribute in each sub-object.

In step 4003C, the object process flags each sub-object as valid if any attribute of the sub-object is valid.

In step 4003D, the object process groups all sub-objects flagged as valid into a sub-object list.

In step 4003E, the object process flags the sub-object list as valid if any sub-object in the sub-object list is flagged as valid.

FIG. 3A illustrates data of the business application represented in tables in the business application database, in accordance with the embodiments of the present invention.

In one embodiment, a business application is a software performing requisitions. The requisition software has a record object Requisition. A record is stored in a form of table in a requisition database. A requisition item record is stored in a REQITEM table 610. Each column of the REQITEM table represents an attribute of the REQITEM table 610. The embodiment of this example does not comprise a sub-object, but comprise only attributes.

A first attribute REQID of the REQITEM table 610 represents an identifier of a requisition. A second attribute REQITEMNUM represents a requisition item that is transacted in the requisition. A third attribute CURR_CD represents a currency code that is used in the requisition item. A fourth attribute UOM_CD represents a unit of measure code that is used in the requisition item. A fifth attribute CTRY_CD represents a country code that is used in the requisition item.

A set of valid values for the currency code attribute is stored in a CURRENCY table 620. A set of valid values for the unit of measure code is stored in a UOM table 630. A set of valid values for the country record is stored in a COUNTRY table 640.

FIG. 3B illustrates a record object table in a database representing a record object that is returned to a requester application in step 1304 of FIG. 2, supra, after performing the method of the present invention over tables illustrated in FIG. 3A, supra, in accordance with the embodiments of the present invention.

A first element REQID of the OBJECT table 650 represents an identifier attribute of a requisition. A second element REQITEMNUM represents a requisition item attribute that is transacted in the requisition. A third element CURR_CD represents a currency code attribute that is used in the requisition item. The CURR_CD attribute in the REQITEM table 610 comprises three values of USD, RUP, and SUR. The CURRENCY table 620 that comprises valid values for the currency code attribute comprises USD, RUP, and DNR. Because the third row of the REQITEM table 610 that has SUR for the currency code attribute is not listed in the configuration table CURRENCY table 620, SUR is determined to be an invalid value for the currency code in step 1302 of FIG. 2, supra. A fourth element CURR_CD_VLDT is a validity flag for a value of the currency code attribute in the REQITEM table 610. A first row of CURR_CD_VLDT has USD value as it is valid from the configuration table CURRENCY table 620. A second row of CURR_CD_VLDT has RUP value as it is valid from the configuration table CURRENCY table 620. A third row of CURR_CD_VLDT has a null value as it is invalid from the configuration table CURRENCY table 620.

A fifth attribute UOM_CD represents a unit of measure code that is used in the requisition item. The UOM_CD attribute in the REQITEM table 610 comprises three values of HR, KEG, and PTR. The UOM table 630 that comprises valid values for the unit of measure code attribute comprises HR, KGR, and PTR. Because the second row of the REQITEM table 610 that has KEG for the unit of measure code attribute is not listed in the configuration table UOM table 630, KEG is determined to be an invalid value for the unit of measure code in step 1302 of FIG. 2, supra. A sixth element UOM_CD_VLDT is a validity flag for a value of the unit of measure code attribute in the REQITEM table 610. A first row of UOM_CD_VLDT has HR value as it is valid from the configuration table UOM table 620. A second row of UOM_CD_VLDT has a null value as it is invalid from the configuration table UOM table 620. A third row of UOM_CD_VLDT has PTR value as it is valid from the configuration table UOM table 620.

A seventh attribute CTRY_CD represents a country code that is used in the requisition item. The CTRY_CD attribute in the REQITEM table 610 comprises three values of US, IN, and ZM. The COUNTRY table 640 that comprises valid values for the country code attribute comprises US, IN, and GB. Because the third row of the REQITEM table 610 that has ZM for the currency code attribute is not listed in the configuration table COUNTRY table 640, ZM is determined to be an invalid value for the currency code in step 1302 of FIG. 2, supra. An eighth element CTRY_CD_VLDT is a validity flag for a value of the country code attribute in the REQITEM table 610. A first row of CTRY_CD_VLDT has US value as it is valid from the configuration table COUNTRY table 640. A second row of CTRY_CD_VLDT has IN value as it is valid from the configuration table COUNTRY table 640. A third row of CTRY_CD_VLDT has a null value as it is invalid from the configuration table COUNTRY table 640.

FIG. 4 illustrates a query in Structured Query Language (SQL) to attain a record object table 650 of FIG. 3B, in accordance with the embodiments of the present invention.

A query 660 is constructed in SQL to retrieve data from the REQITEM table, the CURRENCY table, the UOM table, and the COUNTRY table of FIG. 3A, supra, to produce a result of the query 660 comprising data values indicating validity of the data in the REQITEM table against all configuration tables for attributes in the REQITEM table. In the query 660, the REQITEM table is referred to as A, the CURRENCY table is referred to as B, the UOM table is referred to as C, and the COUNTRY table is referred to as D. The query 660 returns a row per requisition item that has same REQID attribute that indicates a requisition identifier and same REQITNUM attribute that indicates a requisition item number. Because REQID values are identical for all records as defined in line L29, rows are distinguished by REQITNUM values in the result of the query 660. Each row in the result has the requisition identifier REQID, the requisition item number REQITNUM, the currency code CURR_CD, a currency code validity flag CURR_CD_VLDT of which value is determined in lines L05 to L09, the unit of measure code UOM_CD, a unit of measure code validity flag UOM_CD_VLDT of which value is determined in lines L11 to L15, the country code CTRY_CD, and a country code validity flag CTRY_CD_VLDT of which value is determined in lines L17 to L21.

FIGS. 5A, 5B, 5C and 5D illustrate example Java® program codes of the data validator 500, in accordance with embodiments of the present invention.

A Java® program object RequisitionItem is created for each row of a query result. Lines L501 to L533 define a class RequisitionItem. RequisitionItem class comprises a first data element currency that is defined in line L502, a first validity flag for the first data element currencyValid that is defined in line L505, a second data element unitofMeasure that is defined in line L503, a second validity flag for the second data element uomValid that is defined in line L506, a third data element country that is defined in line L504, and a third validity flag for the third data element countryValid that is defined in line L507.

RequisitionItem class further comprises object methods setValidatedCurrency( ) that is defined in lines L508 to L515, getCurrency( ) that is defined in lines L516 to L518, isCurrencyValid( ) that is defined in lines L519 to L521, hasAnyInvalidDataelement( ) that is defined in lines L522 to L525, and hasAnyValidDataelement( ) that is defined in lines L526 to L532. The RequisitionItem item has methods hasAnyInvalidDataelement( ) and hasAnyValidDataelement( ) to provide other program modules with a high-level validity information that indicates whether the RequisitionItem item comprises any invalid and/or valid data element prior to checking the validity of individual data element. The setValidatedCurrency( ) method can add additional logic when setting a data element is valid or not.

Each RequisitionItem item is stored in a RequisitionItemList list. The RequisitionItemList list can be used by any program module that needs validated RequisitionIem items in performing a transaction. Lines L534 to L569 define methods for RequisitionItemList that comprises RequisitionItem objects.

A first method hasItemWithInvalidDataElement( ) is defined in lines L534 to L545. The first method hasItemWithInvalidDataElement( ) invokes hasAnyInvalidDataelement( ) that is defined in lines L522 to L525 of RequisitionItem class definition. A second method hasItemWithValidDataElement( ) is defined in lines L546 to L557. The second method hasItemWithValidDataElement( ) invokes hasAnyValidDataelement( ) that is defined in lines L526 to L532 of RequisitionItem class definition. A third method hasItemWithInvalidCurrencyCode( ) is defined in lines L558 to L569. The third method hasItemWithInvalidCurrencyCode ( ) invokes isCurrencyValid( ) that is defined in lines L519 to L521 of RequisitionItem class definition. RequisitionItemList class may further comprises hasItemWithInvalidUomCode( ) and hasItemWithInvalidCountryCode( ) for each data element.

Figure 6:
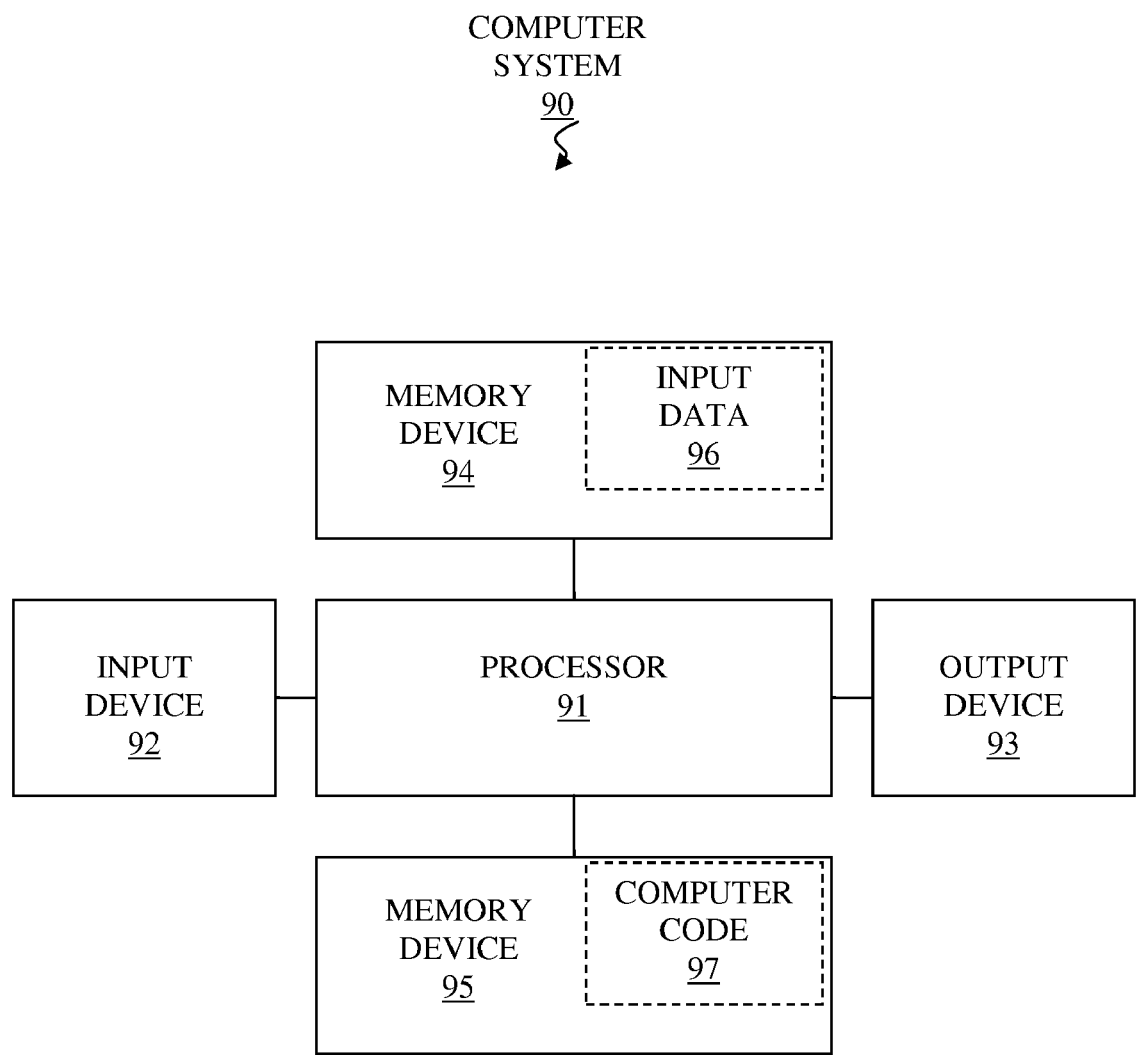
FIG. 6 illustrates a computer system used for utilizing a record stored in a database, in accordance with embodiments of the present invention.

FIG. 6 illustrates a computer system 90 used for utilizing a record stored in a database, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for utilizing a record stored in a database according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for utilizing a record stored in a database of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for utilizing a record stored in a database.

In another embodiment, the invention provides a business method that performs the process steps of the invention on a subscription, advertising and/or fee basis. That is, a service provider, such as a Solution Integrator, can offer to create, maintain, support, etc. a process for utilizing a record stored in a database of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for utilizing a record stored in a database, the method comprising:

receiving, from a requester application, a request for validating the record, the record comprising at least one attribute having a respective value as stored in the database, wherein the record stored in the database represents an object operated by the requester application, wherein the object is selected from a data entity, a business transaction performed by the requester application, and combinations thereof, wherein the business transaction is selected from the group consisting of requisition, purchase, invoice, and combinations thereof;

validating the record resulting in a validated record by creating and subsequently executing a query against at least one attribute configuration table stored in the database, wherein said at least one attribute configuration table corresponds to said at least one attribute of the record, wherein said executing the query results in a query result comprising a respective attribute validity flag for each attribute of said at least one attribute, wherein the respective attribute validity flag is instantiated pursuant to each attribute configuration table, wherein said each attribute configuration table contains a respective set of valid values for each attribute of the record, wherein the requester application dynamically updates the respective set of valid values in said each attribute configuration table as the requester application performs any business transaction modifying a respective value of said each attribute, wherein the record is validated if said each attribute of the record is determined to be either valid or invalid pursuant to said each attribute configuration table for said each attribute;

creating a business object with the validated record, wherein the business object comprises said at least one attribute of the record and the respective attribute validity flag as instantiated from said validating;

flagging an object validity flag for the created business object as valid upon determining that the created business object comprises at least one valid attribute such that the object validity flag enables the request application to determine whether or not the created business object comprises at least one valid attribute without examining the respective attribute validity flag for said each attribute of the created business object; and sending the flagged business object to the requester application such that the requester application utilizes the business object flagged as valid corresponding to the validated record in performing the business transaction.

2. The method of claim 1, said validating the record comprising:

determining that the record comprises at least one compound attribute corresponding to a respective sub-object, wherein the respective sub-object is another object that is a component of the business object and each attribute of the respective sub-object is selected from said at least one attributes of the business object; and creating the query result by executing the query comparing respective values of all attributes of all sub-objects in the record against values of respective attribute configuration tables, wherein the query result comprises a respective attribute validity flag, wherein the respective attribute validity flag is identical to a first value of a first attribute of a first sub-object if the first value is found in a first attribute configuration table corresponding to the first attribute, and wherein the respective attribute validity flag is identical to a null ($\emptyset$) for a second value of a second attribute of a second sub-object if the second value is not found in a second attribute configuration table corresponding to the second attribute.

3. The method of claim 1, said validating the record comprising:
  determining that the record does not comprise a compound attribute corresponding to a sub-object; and
  creating the query result by executing the query comparing respective values of all attributes of the record against values of respective attribute configuration tables, wherein the query result comprises a respective attribute validity flag, wherein the respective attribute validity flag is identical to a first value of a first attribute of said at least one attribute of the record if the first value is found in a first attribute configuration table corresponding to the first attribute, and wherein the respective attribute validity flag is identical to a null (ø) for a second value of a second attribute of said at least one attribute of the record if the second value is not found in a second attribute configuration table corresponding to the second attribute.

4. The method of claim 1, said creating the business object comprising:
  fetching all respective values for all attributes in the validated record and the query result;
  subsequent to said fetching, determining that the validated record does not comprise a compound attribute corresponding to a sub-object;
  subsequent to said determining, instantiating attributes of the business object with all respective values of all attributes from said fetching; and
  subsequent to said instantiating, integrating the instantiated business object with the respective attribute validity flag of the query result from said validating.

5. The method of claim 1, said creating the business object comprising:
  fetching all respective values for all attributes in the validated record and the query result;
  subsequent to said fetching, determining that the record comprises at least one compound attribute corresponding to a respective sub-object, wherein the respective sub-object is another object that is a component of the business object and each attribute of the respective sub-object is selected from said at least one attributes of the business object;
  subsequent to said determining, generating a list of sub-objects as a result of validating all sub-objects in the record;
  subsequent to said generating, instantiating the business object with all respective values of all attributes from said validating;
  subsequent to said instantiating, integrating the instantiated business object with the respective attribute validity flag of the query result from said validating; and
  subsequent to said integrating, inserting the list of sub-objects from said generating into the business object.

6. The method of claim 5, said generating comprising:
  instantiating all sub-objects of the business object with respective value and respective attribute validity flag for each attribute in the validated record;
  subsequent to said instantiating, marking the attribute validity flag for each attribute in all sub-objects;
  subsequent to said marking, flagging a sub-object validity flag for each sub-object comprising any valid attribute as valid such that the sub-object validity flag enables the requester application to determine that the respective sub-object is valid without examining each component attribute of the sub-object;
  subsequent to said flagging, inserting all valid sub-objects from said flagging into the list of sub-objects; and
  subsequent to said inserting, tagging a sub-object list validity flag for the list of sub-objects comprising any valid sub-object as valid such that the sub-object list validity flag enables the requester application to determine that all sub-objects listed in the list of sub-objects are valid without examining each component sub-object in the list of sub-objects.

7. A computer program product, comprising a computer usable storage medium having a computer readable program code embodied therein, said computer readable program code containing instructions that when executed by a processor of a computer system implement a method for utilizing a record stored in a database, the method comprising:
  receiving, from a requester application, a request for validating the record, the record comprising at least one attribute having a respective value as stored in the database, wherein the record stored in the database represents an object operated by the requester application, wherein the object is selected from a data entity, a business transaction performed by the requester application, and combinations thereof, wherein the business transaction is selected from the group consisting of requisition, purchase, invoice, and combinations thereof;
  validating the record resulting in a validated record by creating and subsequently executing a query against at least one attribute configuration table stored in the database, wherein said at least one attribute configuration table corresponds to said at least one attribute of the record, wherein said executing the query results in a query result comprising a respective attribute validity flag for each attribute of said at least one attribute, wherein the respective attribute validity flag is instantiated pursuant to each attribute configuration table, wherein said each attribute configuration table contains a respective set of valid values for each attribute of the record, wherein the requester application dynamically updates the respective set of valid values in said each attribute configuration table as the requester application performs any business transaction modifying a respective value of said each attribute, wherein the record is validated if said each attribute of the record is determined to be either valid or invalid pursuant to said each attribute configuration table for said each attribute;
  creating a business object with the validated record, wherein the business object comprises said at least one attribute of the record and the respective attribute validity flag as instantiated from said validating;
  flagging an object validity flag for the created business object as valid upon determining that the created business object comprises at least one valid attribute such that the object validity flag enables the request application to determine whether or not the created business object comprises at least one valid attribute without examining the respective attribute validity flag for said each attribute of the created business object; and
  sending the flagged business object to the requester application such that the requester application utilizes the business object flagged as valid corresponding to the validated record in performing the business transaction.

8. The computer program product of claim 7, said validating the record comprising:
  determining that the record comprises at least one compound attribute corresponding to a respective sub-object, wherein the respective sub-object is another object that is a component of the business object and each attribute of the respective sub-object is selected from said at least one attributes of the business object; and creating the query result by executing the query comparing respective values of all attributes of all sub-objects in the record against values of respective attribute configuration tables, wherein the query result comprises a respective attribute validity flag, wherein the respective attribute validity flag is identical to a first value of a first attribute of a first sub-object if the first value is found in a first attribute configuration table corresponding to the first attribute, and wherein the respective attribute validity flag is identical to a null (ø) for a second value of a second attribute of a second sub-object if the second value is not found in a second attribute configuration table corresponding to the second attribute.

9. The computer program product of claim 7, said validating the record comprising:
determining that the record does not comprise a compound attribute corresponding to a sub-object; and
creating the query result by executing the query comparing respective values of all attributes of the record against values of respective attribute configuration tables, wherein the query result comprises a respective attribute validity flag, wherein the respective attribute validity flag is identical to a first value of a first attribute of said at least one attribute of the record if the first value is found in a first attribute configuration table corresponding to the first attribute, and wherein the respective attribute validity flag is identical to a null (ø) for a second value of a second attribute of said at least one attribute of the record if the second value is not found in a second attribute configuration table corresponding to the second attribute.

10. The computer program product of claim 7, said creating the business object comprising:
fetching all respective values for all attributes in the validated record and the query result;
subsequent to said fetching, determining that the validated record does not comprise a compound attribute corresponding to a sub-object;
subsequent to said determining, instantiating attributes of the business object with all respective values of all attributes from said fetching; and
subsequent to said instantiating, integrating the instantiated business object with the respective attribute validity flag of the query result from said validating.

11. The computer program product of claim 7, said creating the business object comprising:
fetching all respective values for all attributes in the validated record and the query result;
subsequent to said fetching, determining that the record comprises at least one compound attribute corresponding to a respective sub-object, wherein the respective sub-object is another object that is a component of the business object and each attribute of the respective sub-object is selected from said at least one attributes of the business object;
subsequent to said determining, generating a list of sub-objects as a result of validating all sub-objects in the record;
subsequent to said generating, instantiating the business object with all respective values of all attributes from said validating;
subsequent to said instantiating, integrating the instantiated business object with the respective attribute validity flag of the query result from said validating; and
subsequent to said integrating, inserting the list of sub-objects from said generating into the business object.

12. The computer program product of claim 11, said generating comprising:
instantiating all sub-objects of the business object with respective value and respective attribute validity flag for each attribute in the validated record;
subsequent to said instantiating, marking the attribute validity flag for each attribute in all sub-objects;
subsequent to said marking, flagging a sub-object validity flag for each sub-object comprising any valid attribute as valid such that the sub-object validity flag enables the requester application to determine that the respective sub-object is valid without examining each component attribute of the sub-object;
subsequent to said flagging, inserting all valid sub-objects from said flagging into the list of sub-objects; and
subsequent to said inserting, tagging a sub-object list validity flag for the list of sub-objects comprising any valid sub-object as valid such that the sub-object list validity flag enables the requester application to determine that all sub-objects listed in the list of sub-objects are valid without examining each component sub-object in the list of sub-objects.

13. A computer system comprising a processor and a computer readable memory unit coupled to the processor, said memory unit containing instructions that when executed by the processor implement a method for utilizing a record stored in a database, the method comprising:
receiving, from a requester application, a request for validating the record, the record comprising at least one attribute having a respective value as stored in the database, wherein the record stored in the database represents an object operated by the requester application, wherein the object is selected from a data entity, a business transaction performed by the requester application, and combinations thereof, wherein the business transaction is selected from the group consisting of requisition, purchase, invoice, and combinations thereof;
validating the record resulting in a validated record by creating and subsequently executing a query against at least one attribute configuration table stored in the database, wherein said at least one attribute configuration table corresponds to said at least one attribute of the record, wherein said executing the query results in a query result comprising a respective attribute validity flag for each attribute of said at least one attribute, wherein the respective attribute validity flag is instantiated pursuant to each attribute configuration table, wherein said each attribute configuration table contains a respective set of valid values for each attribute of the record, wherein the requester application dynamically updates the respective set of valid values in said each attribute configuration table as the requester application performs any business transaction modifying a respective value of said each attribute, wherein the record is validated if said each attribute of the record is determined to be either valid or invalid pursuant to said each attribute configuration table for said each attribute;
creating a business object with the validated record, wherein the business object comprises said at least one attribute of the record and the respective attribute validity flag as instantiated from said validating;
flagging an object validity flag for the created business object as valid upon determining that the created business object comprises at least one valid attribute such that the object validity flag enables the request application to determine whether or not the created business object comprises at least one valid attribute without examining the respective attribute validity flag for said each attribute of the created business object; and sending the flagged business object to the requester application such that the requester application utilizes the business object flagged as valid corresponding to the validated record in performing the business transaction.

14. The computer system of claim 13, said validating the record comprising:

determining that the record comprises at least one compound attribute corresponding to a respective sub-object, wherein the respective sub-object is another object that is a component of the business object and each attribute of the respective sub-object is selected from said at least one attributes of the business object; and creating the query result by executing the query comparing respective values of all attributes of all sub-objects in the record against values of respective attribute configuration tables, wherein the query result comprises a respective attribute validity flag, wherein the respective attribute validity flag is identical to a first value of a first attribute of a first sub-object if the first value is found in a first attribute configuration table corresponding to the first attribute, and wherein the respective attribute validity flag is identical to a null (ø) for a second value of a second attribute of a second sub-object if the second value is not found in a second attribute configuration table corresponding to the second attribute.

15. The computer system of claim 13, said validating the record comprising:

determining that the record does not comprise a compound attribute corresponding to a sub-object; and creating the query result by executing the query comparing respective values of all attributes of the record against values of respective attribute configuration tables, wherein the query result comprises a respective attribute validity flag, wherein the respective attribute validity flag is identical to a first value of a first attribute of said at least one attribute of the record if the first value is found in a first attribute configuration table corresponding to the first attribute, and wherein the respective attribute validity flag is identical to a null (ø) for a second value of a second attribute of said at least one attribute of the record if the second value is not found in a second attribute configuration table corresponding to the second attribute.

16. The computer system of claim 13, said creating the business object comprising:

fetching all respective values for all attributes in the validated record and the query result;

subsequent to said fetching, determining that the validated record does not comprise a compound attribute corresponding to a sub-object;

subsequent to said determining, instantiating attributes of the business object with all respective values of all attributes from said fetching; and subsequent to said instantiating, integrating the instantiated business object with the respective attribute validity flag of the query result from said validating.

17. The computer system of claim 13, said creating the business object comprising:

fetching all respective values for all attributes in the validated record and the query result;

subsequent to said fetching, determining that the record comprises at least one compound attribute corresponding to a respective sub-object, wherein the respective sub-object is another object that is a component of the business object and each attribute of the respective sub-object is selected from said at least one attributes of the business object;

subsequent to said determining, generating a list of sub-objects as a result of validating all sub-objects in the record;

subsequent to said generating, instantiating the business object with all respective values of all attributes from said validating;

subsequent to said instantiating, integrating the instantiated business object with the respective attribute validity flag of the query result from said validating; and subsequent to said integrating, inserting the list of sub-objects from said generating into the business object.

18. The computer system of claim 17, said generating comprising:

instantiating all sub-objects of the business object with respective value and respective attribute validity flag for each attribute in the validated record;

subsequent to said instantiating, marking the attribute validity flag for each attribute in all sub-objects;

subsequent to said marking, flagging a sub-object validity flag for each sub-object comprising any valid attribute as valid such that the sub-object validity flag enables the requester application to determine that the respective sub-object is valid without examining each component attribute of the sub-object;

subsequent to said flagging, inserting all valid sub-objects from said flagging into the list of sub-objects; and subsequent to said inserting, tagging a sub-object list validity flag for the list of sub-objects comprising any valid sub-object as valid such that the sub-object list validity flag enables the requester application to determine that all sub-objects listed in the list of sub-objects are valid without examining each component sub-object in the list of sub-objects.

19. A process for supporting computer infrastructure, said process comprising providing at least one support service for at least one of creating, integrating, hosting, maintaining, and deploying computer-readable code in a computing system, wherein the code in combination with the computing system performs a method for utilizing a record stored in a database, the method comprising:

receiving, from a requester application, a request for validating the record, the record comprising at least one attribute having a respective value as stored in the database, wherein the record stored in the database represents an object operated by the requester application, wherein the object is selected from a data entity, a business transaction performed by the requester application, and combinations thereof, wherein the business transaction is selected from the group consisting of requisition, purchase, invoice, and combinations thereof;

validating the record resulting in a validated record by creating and subsequently executing a query against at least one attribute configuration table stored in the database, wherein said at least one attribute configuration table corresponds to said at least one attribute of the record, wherein said executing the query results in a query result comprising a respective attribute validity flag for each attribute of said at least one attribute, wherein the respective attribute validity flag is instantiated pursuant to each attribute configuration table, wherein said each attribute configuration table contains a respective set of valid values for each attribute of the record, wherein the requester application dynamically updates the respective set of valid values in said each attribute configuration table as the requester application performs any business transaction modifying a respective value of said each attribute, wherein the record is validated if said each attribute of the record is determined to be either valid or invalid pursuant to said each attribute configuration table for said each attribute;

creating a business object with the validated record, wherein the business object comprises said at least one attribute of the record and the respective attribute validity flag as instantiated from said validating;

flagging an object validity flag for the created business object as valid upon determining that the created business object comprises at least one valid attribute such that the object validity flag enables the request application to determine whether or not the created business object comprises at least one valid attribute without examining the respective attribute validity flag for said each attribute of the created business object; and sending the flagged business object to the requester application such that the requester application utilizes the business object flagged as valid corresponding to the validated record in performing the business transaction.

20. The process of claim 19, said validating the record comprising:

determining that the record comprises at least one compound attribute corresponding to a respective sub-object, wherein the respective sub-object is another object that is a component of the business object and each attribute of the respective sub-object is selected from said at least one attributes of the business object; and creating the query result by executing the query comparing respective values of all attributes of all sub-objects in the record against values of respective attribute configuration tables, wherein the query result comprises a respective attribute validity flag, wherein the respective attribute validity flag is identical to a first value of a first attribute of a first sub-object if the first value is found in a first attribute configuration table corresponding to the first attribute, and wherein the respective attribute validity flag is identical to a null (ø) for a second value of a second attribute of a second sub-object if the second value is not found in a second attribute configuration table corresponding to the second attribute.

21. The process of claim 19, said validating the record comprising:

determining that the record does not comprise a compound attribute corresponding to a sub-object; and creating the query result by executing the query comparing respective values of all attributes of the record against values of respective attribute configuration tables, wherein the query result comprises a respective attribute validity flag, wherein the respective attribute validity flag is identical to a first value of a first attribute of said at least one attribute of the record if the first value is found in a first attribute configuration table corresponding to the first attribute, and wherein the respective attribute validity flag is identical to a null (ø) for a second value of a second attribute of said at least one attribute of the record if the second value is not found in a second attribute configuration table corresponding to the second attribute.

22. The process of claim 19, said creating the business object comprising:

fetching all respective values for all attributes in the validated record and the query result;

subsequent to said fetching, determining that the validated record does not comprise a compound attribute corresponding to a sub-object;

subsequent to said determining, instantiating attributes of the business object with all respective values of all attributes from said fetching; and subsequent to said instantiating, integrating the instantiated business object with the respective attribute validity flag of the query result from said validating.

23. The process of claim 19, said creating the business object comprising:

fetching all respective values for all attributes in the validated record and the query result;

subsequent to said fetching, determining that the record comprises at least one compound attribute corresponding to a respective sub-object, wherein the respective sub-object is another object that is a component of the business object and each attribute of the respective sub-object is selected from said at least one attributes of the business object;

subsequent to said determining, generating a list of sub-objects as a result of validating all sub-objects in the record;

subsequent to said generating, instantiating the business object with all respective values of all attributes from said validating;

subsequent to said instantiating, integrating the instantiated business object with the respective attribute validity flag of the query result from said validating; and subsequent to said integrating, inserting the list of sub-objects from said generating into the business object.

24. The process of claim 23, said generating comprising:

instantiating all sub-objects of the business object with respective value and respective attribute validity flag per attribute for each attribute in the validated record;

subsequent to said instantiating, marking the attribute validity flag for each attribute in all sub-objects;

subsequent to said marking, flagging a sub-object validity flag for each sub-object comprising any valid attribute as valid such that the sub-object validity flag enables the requester application to determine that the respective sub-object is valid without examining each component attribute of the sub-object;

subsequent to said flagging, inserting all valid sub-objects from said flagging into the list of sub-objects; and subsequent to said inserting, tagging a sub-object list validity flag for the list of sub-objects comprising any valid sub-object as valid such that the sub-object list validity flag enables the requester application to determine that all sub-objects listed in the list of sub-objects are valid without examining each component sub-object in the list of sub-objects.

* * * * *